United States Patent [19]

Paton et al.

[11] Patent Number: 4,549,060
[45] Date of Patent: Oct. 22, 1985

[54] MOBILE ARRANGEMENT FOR LAYING A CONTINUOUS PIPELINE

[75] Inventors: Boris E. Paton, Kiev; Boris E. Scherbina, Moscow; Vladimir K. Lebedev, Kiev; Oleg M. Ivantsov, Moscow; Sergei I. Kuchuk-Yatsenko, Kiev; Vasily A. Sakharnov, Kiev; Boris A. Galyan, Kiev; Orest M. Serafin, Dolgoprudny; Valentin I. Krivorotenko, Kiev; Mikhail R. Unigovsky, Kiev; Sergei A. Solodovnikov, Kiev; Evgeny V. Rulevsky, Kiev, all of U.S.S.R.

[73] Assignee: Institut Elektrosvarki Imeni E. O. Patona, Kiev, U.S.S.R.

[21] Appl. No.: 533,162

[22] Filed: Sep. 19, 1983

Related U.S. Application Data

[63] Continuation of Ser. No. 225,244, Jan. 15, 1981, abandoned.

[51] Int. Cl.$^4$ .............................................. B23K 11/00
[52] U.S. Cl. .................................. 219/59.1; 219/60 R
[58] Field of Search ...................... 219/59.1, 60 R, 61, 219/78.13, 78.15, 158, 100; 405/154, 155; 29/33

[56] References Cited

U.S. PATENT DOCUMENTS

Re. 20,439  7/1937  Rippel ................................. 29/33 A
2,564,391   8/1951  Burns, Jr. ............................ 29/33 A
4,076,130   2/1978  Sumner .
4,166,544   9/1979  Cecchi et al. ...................... 405/154 X

FOREIGN PATENT DOCUMENTS 729287    3/1966  Canada ............................. 219/60 R
1292689  10/1972  United Kingdom .
1537968   1/1979  United Kingdom .

OTHER PUBLICATIONS

V. K. Lebedev, G. V. Gorbunov, Kontaktnaya svarka truboprovodov, "Reklava" Publishers, Kiev, 1968, pp. 18, 22, 23 and 24.
Cary, Howard B., Modern Welding Technology, Prentice-Hall, Inc.; N.J., 1979, 78-2966, pp. 266-267.

Primary Examiner—Roy N. Envall, Jr.
Assistant Examiner—C. M. Sigda
Attorney, Agent, or Firm—Fleit, Jacobson, Cohn & Price

[57] ABSTRACT

A mobile arrangement for laying a continuous pipeline comprises a resistance welding apparatus, an outer flash trimmer, and at least one pipe-laying means. A jib of the pipe-laying means has a longitudinal support structure suspended therefrom. A suspension is attached to this longitudinal support structure. The front end of said longitudinal support structure carries an outer flash trimmer, and the rear end of said longitudinal support structure carries an inductor for thermal treatment of the weld.

4 Claims, 6 Drawing Figures

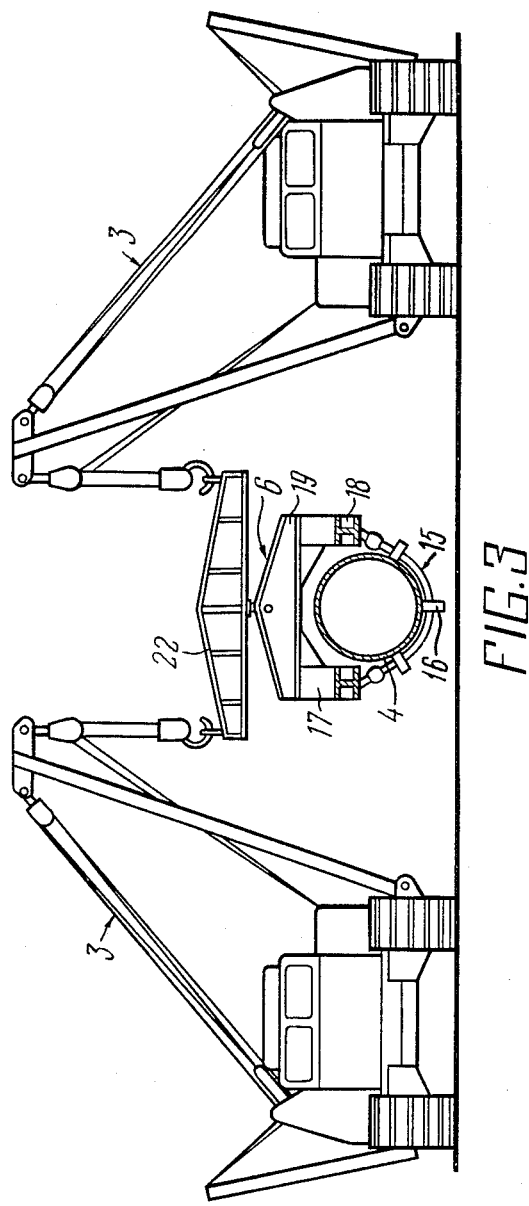

MOBILE ARRANGEMENT FOR LAYING A CONTINUOUS PIPELINE

This application is a continuation of application Ser. No. 225,244, filed 1-15-81, now abandoned.

BACKGROUND OF THE INVENTION

1. Field of the Invention

The present invention relates to welding equipment and particularly to a mobile arrangement for laying a continuous pipeline. Most advantageously the invention can be used in laying main oil and gas pipelines, water supply systems, in-pipe pneumatic conveyors etc.

2. Description of the Prior Art

Since 1950, when resistance welding was used for the first time in laying pipelines, the improvement of equipment for this type of welding had as its aim a higher efficiency in assembling and welding of pipes into a continuous pipeline. The method of laying a continuous pipeline comprises a number of various operations which, in most cases, can be carried out in succession only. Therefore, saving of time spent for preparatory and auxiliary works carried out between operations can appreciably decrease the time duration of laying a pipeline and will make it possible to take advantage of such highly productive method as resistance welding. It is to be noted that making of butt-type joint only takes 0.5 to 1 sec., flash removal takes 1 to 5 sec, and thermal treatment of one weld takes 5 60 sec. At the same time the preparatory and auxiliary works carried out between operations with the aid of conventional equipment take 10 to 30 min. The urgency of the problem under consideration is apparent when it is considered that the quantity of welds to be made in a main pipeline may be more than 100,000. The results of the investigation of the possibilities of the conventional equipment prove that this problem has not been adequately solved up till now.

Known in the art is a mobile arrangement for resistance welding of 529 mm in diameter pipes into a continuous pipeline (see, for instance, V. K. Lebedev, G. V. Gorbunov, Kontaktnaya svarka truboprovodov, "Reklama" Publishers, Kiev, 1968, p.18). This arrangement comprises a pipe-laying means having a jib with a welding head suspended therefrom. The welding head encompasses the pipes being welded and is supported by their walls through rollers. The pipelaying means mounts a power-supply set connected with the welding head by an electric cable. It follows from the description of the arrangement that the latter ensures only the welding of pipes, whereas such operations as inner flash removal and outer flash removal are to be carried out by hand.

There is also known in the art a more efficient mobile arrangement for laying pipelines (see V. K. Lebedev, G. V. Gorbunov, Kontaktnaya svarka truboprovodov, "Reklama" Publishers, Kiev, 1968, p 23). The arrangement comprises an in-pipe resistance welding apparatus supported by the walls of the pipeline and connected with a source of electric power. The apparatus incorporates a self-contained drive and an internal flash trimmer. The arrangement is provided with an outer flash trimmer which is suspended from the jib of the pipe-laying means. In front of the latter there is disposed another pipe-laying means whose jib carries a suspension with supporting rollers for supporting the pipeline. The above suspension is attached directly to the rope passed over the end of said jib.

An obvious advantage of the described welding arrangement consists in that it permits not only the welding process but also flash removal to be mechanized. However the productivity of this welding arrangement is appreciably restricted by the necessity of carrying out a number of auxiliary operations. For instance, in order to remove flash after welding the pipes, it is necessary to lower the pipeline onto supports or to heap up soil thereunder by bulldozer, to back away the pipelaying means carrying the suspension, to make place for the pipe-laying means carrying the outer flash trimmer, to bring the latter pipelaying means to the weld and only then to remove the outer flash. It is to be noted that the flash is best to remove in hot state immediately after welding, but this is prevented by the necessity of carrying out the above auxiliary operations.

SUMMARY OF THE INVENTION

The principal object of the present invention is to provide a mobile arrangement for laying a continuous pipeline, which makes it possible to remove outer flash immediately after resistance welding without carrying out a plurality of auxiliary operations.

Another important object of the invention is to provide a more efficient mobile arrangement for laying a continuous pipeline.

Still another object of the invention is to reduce financial expenses and labour consumption in laying pipelines.

These and other objects of the present invention are attained by that there is provided a mobile arrangement for laying a continuous pipeline, comprising a resistance welding apparatus adapted to be supported by walls of a pipeline and connected with a source of electric power, outer flash trimmer, and at least one pipe-laying means whose jib carries a suspension with supporting rollers for supporting the pipeline, wherein, according to the invention, there is a longitudinal support structure suspended from the jib of the pipe-laying means and carrying said suspension, the front end of the longitudinal support structure carrying said outer flash trimmer, and the rear end of said longitudinal support structure carrying an inductor for thermal treatment of the weld.

Such a construction of the arrangement allows an outer flash to be removed immediately after the resistance welding when the weld and flash are still hot. In this case, it is not necessary to lower the pipeline which is supported by the rollers of the suspension. The exclusion of a plurality of auxiliary operations has made it possible to appreciably upgrade the productivity of the arrangement. In addition, the longitudinal support structure has made it possible to conveniently arrange the equipment for thermal treatment of the welds, which resulted, apart from the higher productivity of the arrangement, in a higher quality of the welds. The personnel attending the arrangement of the invention is two times lower than that of the conventional arrangements.

More stable is such a modification of the arrangement wherein two pipe-laying means are disposed on both sides of the pipeline being laid, and said longitudinal support structure is suspended from the jibs of the pipe-laying means with the aid of a cross-piece.

To compensate for a non-synchroneity of the movement of the pipe-laying means and to prevent a possible dangerous bending of the pipeline, it is advisable that the longitudinal support structure be pivotally connected with the cross-piece.

It is expedient that the jibs of said pipe-laying means be made in the form of vertical members, and the cross-piece be suspended from said members at the points whose projections onto the horizontal supporting surface of a ground divides the track width of the corresponding pipe-laying means in two substantially equal parts.

This makes it possible to evenly distribute the load upon the caterpillar tracks of the pipe-laying means and to dispense with massive counterweights and to ensure the operation of the arrangement on a terrain having a complicated relief.

BRIEF DESCRIPTION OF THE DRAWINGS

Now the invention will be explained by way of specific embodiments thereof with reference to the accompanying drawings wherein:

FIG. 3 shows a modification of the mobile arrangement with two pipe-laying means;

DETAILED DESCRIPTION OF THE INVENTION

Figure 1:
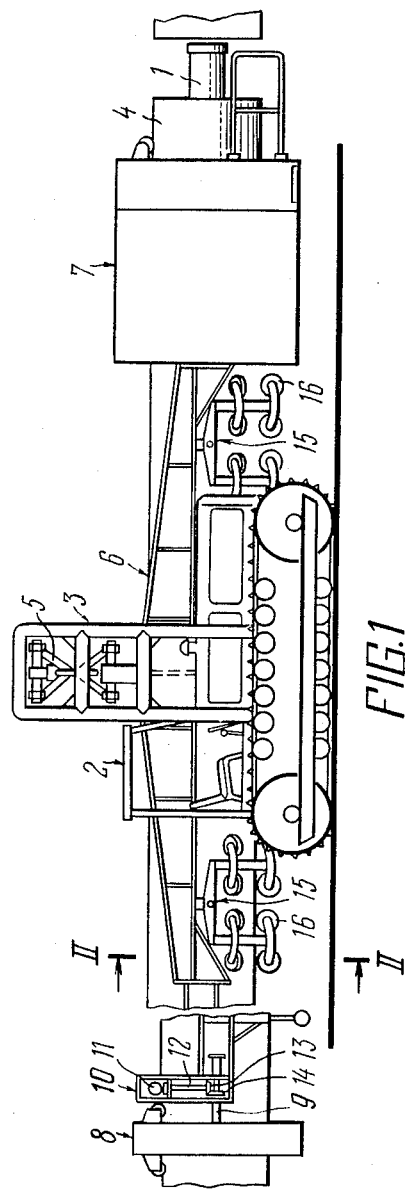
FIG. 1 shows a general view of the mobile arrangement for laying a continuous pipeline, according to the invention.
Figure 2:
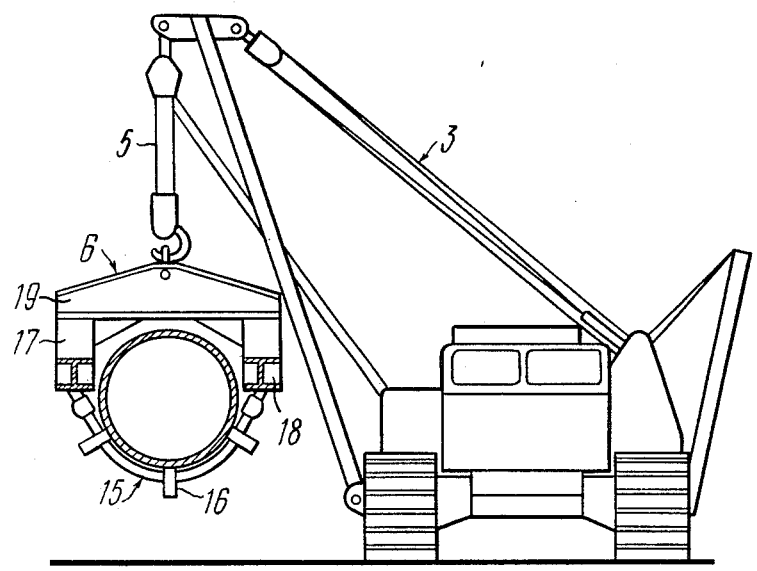
FIG. 2 shows the mobile arrangement in cross-section, the section being on the line II—II of FIG. 1.

A mobile arrangement of the present invention for laying a continuous pipeline comprises a resistance welding apparatus as shown in FIG. 1. In this case FIG. 1 illustrates an in-pipe welding apparatus 1 supported by walls of a pipeline and connected with a source of electric power (not shown). The in-pipe butt welding apparatus has cutters for removing inner flash. Basically, the arrangement of the present invention may also incorporate an out-of-pipe welding apparatus for welding pipes end to end. The arrangement also comprises at least one pipe-laying means 2 having a jib 3 and disposed in parallel with a pipeline 4 being laid. According to the invention a longitudinal support structure 6 is suspended from the jib 3 of the pipe-laying means 2 with the aid of a flexible joint 5. The front end of the longitudinal support structure 6 carries an outer flash trimmer 7. The rear end of the longitudinal support structure 6 carries an inductor 8 for thermal treatment of the weld. The inductor 8 is attached to the longitudinal support structure 6 through adjustable connecting rods 9 and has an inductor positioning mechanism 10 serving for positioning the inductor exactly above the weld. The inductor positioning mechanism 10 has an electric motor 11 whose shaft 12 carries a bevel gear 13. The bevel gear 13 is engaged with a bevel gear 14 secured to the adjustable connecting rod 9. The longitudinal support structure 6 carries a suspension 15 attached thereto and having supporting rollers 16 for supporting the pipeline 4. The suspension 15 which is best seen in FIG. 2 essentially consists of two longitudinal members 17 and 18 connected by means of a connecting by means of a connecting member 19. The supporting rollers 16 are arranged so that they are in radial relationship with the pipeline 4 supported thereby.

The modification of the arrangement shown in FIG. 3 features a considerably higher stability. According to this modification, the mobile arrangement has two pipe-laying means 20 and 21 which are disposed on both sides of the pipeline 4 being laid. The jibs 3 of the pipe-laying means 20 and 21 are symmetrically inclined towards the pipeline 4. A cross-piece 22 is suspended, according to the invention, from the jibs 3. The longitudinal support structure 6 is attached to the cross-piece 22 by means of a vertical pivot 23 and a horizontal pivot 24. According to the preferred embodiment of the invention shown in FIG. 4 the jibs 3 of the pipe-laying means 20 and 21 are made in the form of vertical members 25 and 26. In this embodiment the cross-piece 22 is suspended from the vertical members 25 and 26 at 27 and 28. The projection of the point 27 onto the horizontal supporting surface of a ground 29 divides the track width of the pipe-laying means 20 in two substantially equal parts. This makes it possible to evenly distribute the load over the caterpillar tracks and to dispense with massive counterparts.

Figure 5:
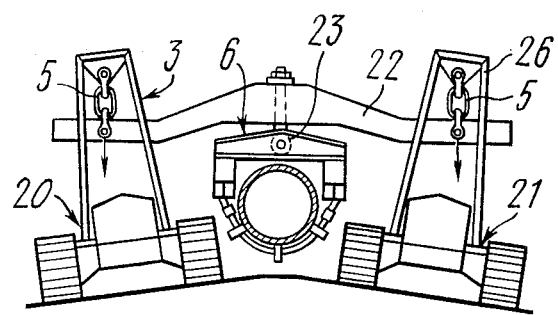
FIG. 5 shows the mobile arrangement with two pipe-laying means on inclined sections of the ground.
Figure 6:
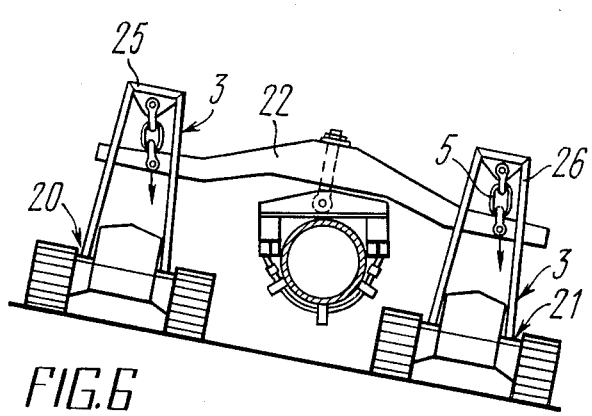
FIG. 6 shows the mobile arrangement of the present invention with two pipe-laying means on a slope.

FIGS. 5 and 6 show this modification of the mobile arrangement on inclined sections of a ground when the pipelaying means 20 and 21 are inclined in different directions and when the pipe-laying means 20 and 21 are inclined in one direction.

The above-described mobile arrangement for laying a continuous pipeline operates in the following way. The welding apparatus 1 moves within the pipe to its end and centers this pipe with the pipeline 4. After welding the pipe to the pipeline the apparatus 1 removes inner flash and moves to the zone of the next weld to be made. At this moment the pipelaying means 2 starts its movement after the apparatus 1. This being the case, the outer flash trimmer 7 passes above the weld and removes the outer flash from the weld which is still hot. As the pipe-laying means 2 moves, the supporting rollers 16 roll over the surface of the pipeline 4 and the pipe welded thereto. When the inductor 8 approaches the welding zone, the pipe-laying means 2 stops. By switching the electric motor 11 on and off the length of the rod 9 is changed so as to locate the inductor exactly above the weld. The inductor 8 heats the weld at a predetermined rate up to a predetermined temperature, thereby subjecting the weld to thermal treatment. It is to be noted that the length of the elongated support structure 6 corresponds to the length of the pipe to be welded. Thus, when the inductor 8 is disposed above one weld, the outer flash trimmer 7 is disposed in the zone of the next weld. Henceforth the mobile arrangement operates substantially as described above.

Figure 4:
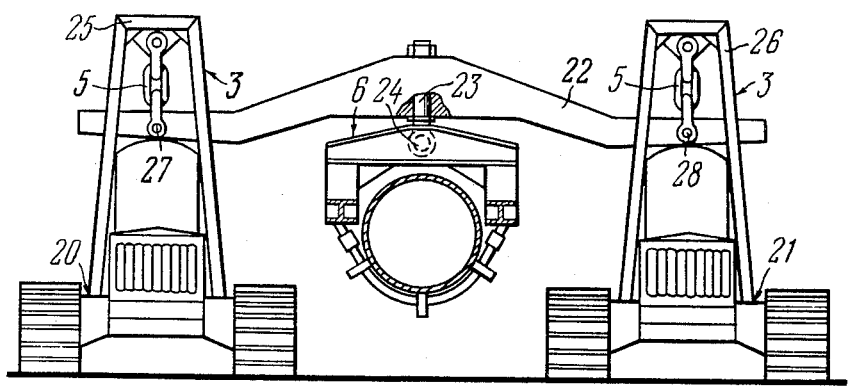
FIG. 4 shows a modification of the mobile arrangement having vertical member provided on the pipe-laying means.

The modification of the mobile arrangement shown in FIG. 3 operates in a manner similar to that described above, but is more stable and makes it possible to weld the pipes on off-road terrain or terrain characterized by a complicated relief. In this case the inclinations of the pipe-laying means and some non-synchroneity in their movement are compensated for by the flexible joints 5 and pivots 23 and 24. Most stable is the modification shown in FIG. 4. As shown in FIGS. 4 to 6, the jibs are made in the form of vertical members, which allows the load to be evenly distributed over the caterpillar tracks of the pipe-laying means 20 and 21. Even on a considerably inclined side of a hill or valley the vertical projection of each point 27 and 28 onto the supporting surface of a ground 29 is within the limits of the track width of the pipe-laying means 20 and 21.

It can be seen from the FIG. 5 that when the relief of the ground causes the inclination of the pipe-laying means 20 and 21 in different directions, the cross-piece 22 remains in the horizontal position, whereas the flexible joints 5 turn. But when the pipelaying means 20 and 22 move on one slope, i.e. are inclined in one direction, the flexible joints 5, in turning, maintain the cross-piece 22 in parallel with the surface of the slope. As this takes place, the longitudinal support structure 6, in turning around the horizontal pivot 24, remains in the horizontal position.

While particular embodiments of the invention have been shown and described, various modifications thereof will be apparent to those skilled in the art and therefore it is not intended that the invention be limited to the disclosed embodiments or to the details thereof and the departures may be made therefrom within the spirit and scope of the invention as defined in the claims.

What we claim is:

1. A mobile arrangement for laying a continuous pipeline, comprising:
   (a) a resistance welding apparatus adapted to be supported by walls of a pipeline and connected with a source of electric power;
   (b) a pair of pipe-laying means provided on opposite sides of the pipeline being laid and in symmetrical relationship with each other, each said pipe-laying means having a jib for supporting a cross-piece located above said pipeline in a vertical plane and perpendicular to the axis thereof, each said pipe-laying means including a mobile carrier;
   (c) a longitudinal support structure supported by said cross-piece and supporting a pipe carrier which extends along the axis of said pipeline;
   (d) at least one suspension attached to said pipe carrier and having supporting roller for supporting said pipeline for movement in an axial direction;
   (e) an outer flash trimmer mounted on the front end of said longitudinal support structure; and
   (f) an inductor for thermal treatment of the weld, mounted on the rear end of said longitudinal support structure.

2. A mobile arrangement for laying a continuous pipeline, comprising:
   (a) a resistance welding apparatus adapted to be supported by walls of a pipeline and connected with a source of electric power;
   (b) a pair of pipe-laying means provided on opposite sides of the pipeline being laid and in symmetrical relationship with each other, each said pipe-laying means mounted on a mobile carrier, and said jibs of said pipe-laying means supporting a cross-piece;
   (c) a longitudinal support structure supported by said mobile carrier which extends along the axis of said pipeline and is suspended from said jibs, said longitudinal support structure pivotally connected with said cross-piece;
   (d) at least one suspension attached to said longitudinal support structure and having supporting rollers for supporting said pipeline;
   (e) an outer flash trimmer mounted on the front end of said longitudinal support structure; and
   (f) an inductor for thermal treatment of the weld, mounted on the rear end of said longitudinal support structure.

3. A mobile arrangement as claimed in claim 1, wherein said cross-piece is suspended from said jibs at the points whose projections onto the horizontal supporting surface of the ground divides the track width of the corresponding pipe-laying means into two substantially equal parts.

4. A mobile arrangement for laying a continuous pipeline, comprising:
   (a) a resistance welding apparatus adapted to be supported by walls of a pipeline and connected with a source of electric power;
   (b) at least one pipe-laying means having a jib and disposed so that said jib is located above said pipeline in a vertical plane perpendicular to the axis thereof, said pipe-laying means mounted on a mobile carrier;
   (c) a longitudinal support structure supported by said mobile carrier which extends along the axis of said pipeline and is suspended from said jib;
   (d) at least two suspensions attached to said longitudinal support structure and having supporting rollers for supporting said pipeline to permit said mobile carrier to move axially relative to said pipeline and while supporting said pipeline in a predetermined position relative to the ground;
   (e) an outer flash trimmer mounted on the front end of said longitudinal support structure;
   (f) an inductor for thermal treatment of the weld, mounted on the rear end of said longitudinal support structure.

* * * * *